(12) United States Patent
Kamarthy et al.

(10) Patent No.: US 8,656,170 B2
(45) Date of Patent: Feb. 18, 2014

(54) PROTECTION OF CONTROL PLANE TRAFFIC AGAINST REPLAYED AND DELAYED PACKET ATTACK

(75) Inventors: Kavitha Kamarthy, Milpitas, CA (US);
Sheela D. Rowles, Cupertino, CA (US);
Dinesh Ranjit, San Jose, CA (US);
Tanya Roosta, Saratoga, CA (US);
Warren S. Wainner, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 12/789,595

(22) Filed: May 28, 2010

(65) Prior Publication Data

US 2011/0296185 A1    Dec. 1, 2011

(51) Int. Cl.
*H04L 29/06* (2006.01)

(52) U.S. Cl.
USPC ........................................................ 713/171

(58) Field of Classification Search
USPC ................................................ 713/171, 160
See application file for complete search history.

(56) References Cited

U.S. PATENT DOCUMENTS

| | | | |
|---|---|---|---|
| 6,301,249 B1 * | 10/2001 | Mansfield et al. | 370/394 |
| 6,697,374 B1 * | 2/2004 | Marmur et al. | 370/458 |
| 6,891,818 B1 * | 5/2005 | Jarvisalo et al. | 370/337 |
| 7,085,273 B1 * | 8/2006 | Chuah | 370/394 |
| 7,116,668 B2 * | 10/2006 | Sivalingham | 370/394 |
| 7,363,572 B2 * | 4/2008 | Sidenblad et al. | 714/758 |
| 7,392,382 B1 | 6/2008 | Weis et al. | |
| 7,468,981 B2 | 12/2008 | Weis et al. | |
| 7,688,842 B2 * | 3/2010 | Pullen et al. | 370/428 |
| 7,761,469 B2 * | 7/2010 | Rowley | 707/781 |
| 7,769,876 B2 * | 8/2010 | Banerjee et al. | 709/230 |
| 7,944,814 B2 * | 5/2011 | Nissan et al. | 370/220 |
| 7,969,924 B2 * | 6/2011 | Young et al. | 370/311 |
| 7,992,201 B2 * | 8/2011 | Aldridge et al. | 726/15 |
| 2005/0041586 A1 * | 2/2005 | Jiang | 370/236 |
| 2006/0239218 A1 * | 10/2006 | Weis et al. | 370/312 |
| 2007/0201390 A1 * | 8/2007 | Kim et al. | 370/310.2 |
| 2008/0260151 A1 * | 10/2008 | Fluhrer et al. | 380/255 |
| 2008/0307054 A1 | 12/2008 | Kamarthy et al. | |
| 2009/0080657 A1 | 3/2009 | Asati et al. | |
| 2010/0165839 A1 * | 7/2010 | Senese et al. | 370/232 |
| 2010/0306533 A1 * | 12/2010 | Phatak | 713/156 |
| 2011/0002311 A1 * | 1/2011 | Wang et al. | 370/336 |

OTHER PUBLICATIONS

Transmission Control Protocol; DARPA Internet Program; RFC 973; Sep. 1981.*

* cited by examiner

*Primary Examiner* — Edan Orgad
*Assistant Examiner* — James Turchen
(74) *Attorney, Agent, or Firm* — Edell, Shapiro & Finnan, LLC

(57) ABSTRACT

Techniques are provided for determining freshness of control messages in a network. At a first device that is to enter into a secure communication session with a second device, timestamp information and time window size information are sent to the second device in a control message during a first exchange between a first device and a second device. At the first device, timestamp information and time window size information are obtained from a control message received from the second device by the first device during the first exchange. At the first device, the freshness of a control message is tested based on the timestamp information of the control message during a second exchange and the time window size information received from the second device during the first exchange.

19 Claims, 9 Drawing Sheets

US 8,656,170 B2

PROTECTION OF CONTROL PLANE TRAFFIC AGAINST REPLAYED AND DELAYED PACKET ATTACK

TECHNICAL FIELD

The present disclosure relates to network interface devices and systems and more particularly to replay attack prevention on a control plane.

BACKGROUND

Replay attacks use a simple method of exploiting a captured packet and retransmitting that traffic to cause unexpected results by hijacking the traffic and transmitting it at a later time. Even if the communication medium is protected with encryption and strong authentication, if the receiver cannot detect the freshness of a packet or control message, the attack is deemed successful. A major concern in any key management protocol is if the packets or messages carrying the policies or keying material is delayed or captured and replayed after a few seconds, then the Security Associations are installed with incorrect lifetimes. This would result in dropping of data traffic. Thus, the ability for key management protocols to detect such delay and replayed packets and messages would improve protocols which carry time sensitive information.

These shortcomings may be solved by detecting delayed and replayed packets and messages on the control plane by adding pseudotime information to key management exchange packets. Incorporating the ability to detect delayed and replayed packets and messages in the key management protocol helps to mitigate attacks on these protocols.

DETAILED DESCRIPTION

Overview

Techniques are provided for transmitting a plurality of control messages during a secure communication session and testing for the freshness of the control messages. Timestamp information and time window size information are exchanged as a part of the control messages between a plurality of network interface devices. At a first device that is to enter into a secure communication session with a second device, timestamp information and time window size information are sent in a control message to the second device during a first exchange of a first set of control messages between the first device and the second device. The time window size information defines a time window to be used by the second device to test for freshness of a control message received at the second device from the first device during a second exchange of a second set of control messages and the timestamp information indicates a time of departure of the control message with respect to a timing reference of the first device. The first device also receives timestamp information and time window size information from the second device in a control message during the first exchange from the second device. The time window size information received from the second device defines a time window to be used by the first device to test for freshness of a control message received at the first device from the second device during the second exchange of the second set of control messages. The timestamp information contained in the control message received at the first device indicates a time of departure of the control message with respect to a timing reference of the second device.

Example Embodiments

Figure 1:
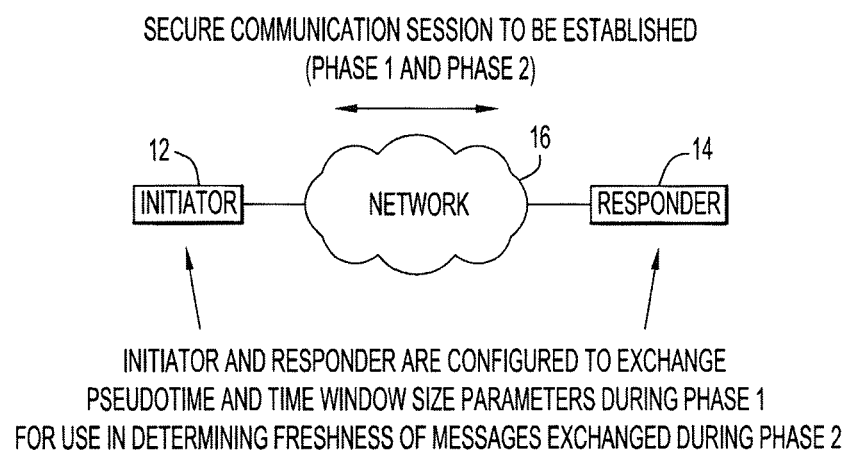
FIG. 1 is a block diagram showing an example of a secure communication network topology with network devices configured to exchange parameters to prevent replay attacks on a control plane.

Referring to FIG. 1, a network topology for a secure communication session between network devices is shown at reference numeral 10. The network topology has a plurality of network devices that are configured to exchange control messages during the secure communication session. For example, initiator 12 and responder 14 are network devices that are configured to exchange control messages over a network 16. The control messages may be exchanged on a control plane, that is, during control signaling between the devices, as opposed to the transmission of data between the devices. For example, the control messages may be control packets or other packets carrying time sensitive information on the control plane of a secure communication session between the network devices. The control messages contain timing information that allows the initiator 12 and responder 14 to test the freshness of the control messages.

Figure 2:
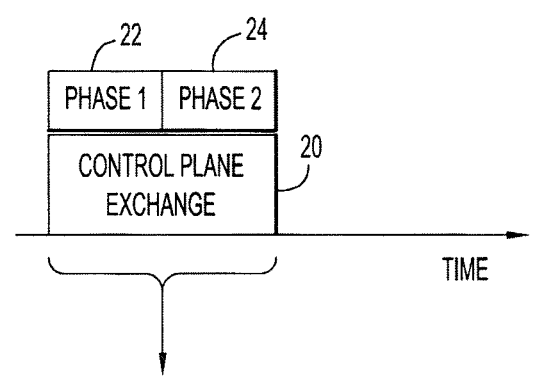
FIG. 2 is an example of a timeline depicting control message freshness testing performed during control plane message exchanges between network devices.

Turning to FIG. 2, the freshness of the control messages may be tested for freshness during multiple exchanges of a control plane exchange shown at reference numeral 20. For example, the control plane 20 may comprise a first phase, Phase 1, shown at reference numeral 22 and a second phase, Phase 2, shown at reference numeral 24. According to the techniques described herein, parameters are included in control messages exchanged between the initiator 12 and responder 14 during a Phase 1 to enable each device to determine the freshness of a control message exchanged during Phase 2. It is also possible that the control messages are tested for freshness during Phase 1.

Figure 3:
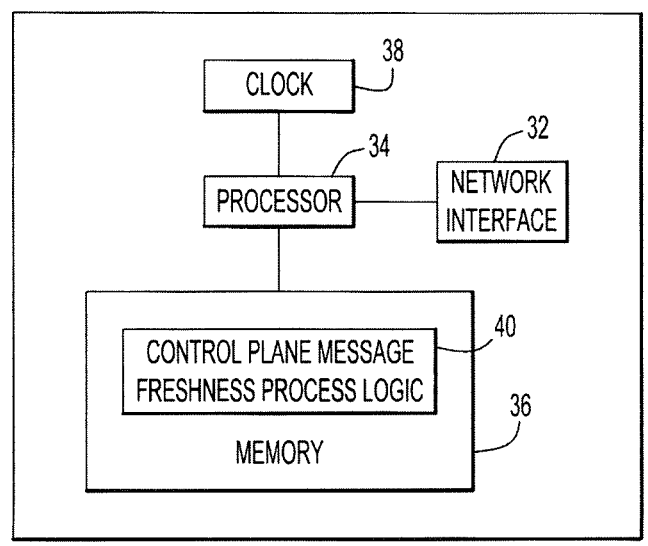
FIG. 3 is an example of a block diagram showing a network device configured to perform control message freshness determination techniques.

Turning to FIG. 3, an example of a block diagram for a network device is shown. The block diagram shown in FIG. 3 is representative of a block diagram for a device that serves as the initiator 12 and the target 14. The network device comprises a network interface 32, a processor 34, a memory 36 and a clock circuit 38. The network interface 32 is configured to send control messages across the network 10. The network interface 32 is also configured to receive control messages and to supply the received control messages to the processor 34. For example, the network interface 32 is an Ethernet card or unit.

The processor 34 is capable of executing program logic instructions (i.e. software) for carrying out various operations and tasks described herein. For example, the processor 34 is a microprocessor, microcontroller, digital signal processor, or other data processing device. The processor 34 is capable of executing control plane message freshness process logic 40 stored in memory 36 to send and receive control messages containing timing information and to test the freshness of the control messages based on the timing information. The functions of processor 34 may be implemented by logic encoded in one or more tangible media (e.g., embedded logic such as an application specific integrated circuit (ASIC), digital signal processor instructions, software that is executed by a processor, etc), wherein memory 36 stores data used for the operations described herein and stores software or processor executable instructions that are executed to carry out the operations described herein. The control plane message freshness process logic 40 may take any of a variety of forms, so as to be encoded in one or more tangible media for execution, such as fixed logic or programmable logic (e.g., software/computer instructions executed by a processor) and the processor 34 may be an ASIC that comprises fixed digital logic, or a combination thereof. For example, the processor 34 may be embodied by digital logic gates in fixed or a programmable digital logic integrated circuit, which digital logic gates are configured to perform the control plane message freshness process logic 40. In another form, the control plane message freshness process logic 40 may be embodied in a processor or computer-readable medium that is encoded with or that stores instructions for execution by a processor (e.g. a processor 34) that, when executed by the processor, are operable to cause the processor to perform the operations described herein in connection with the control plane message freshness process logic 40. Thus, the memory 36 may be random access memory (RAM), read only memory (ROM) or any other suitable memory that can store instructions that, when executed by a processor, cause the processor to execute operations.

The clock circuit 38 is a clock chip device that generates the various timing signals used for operations of the network device. To this end, the clock 38 serves as a timing reference and is used for purposes of generating a timestamp for a control message that is to be sent by the network device. The timestamp for a control message is also referred to herein as a "Pseudotime" quantity or "Pseudotime" information because it represents a timestamp for a time of departure relative to a timing reference derived from the clock of the device that sends that message. The Pseudotime quantity is used by the network devices for purposes of control message freshness determination, as will become more apparent from the following description.

Figure 4:
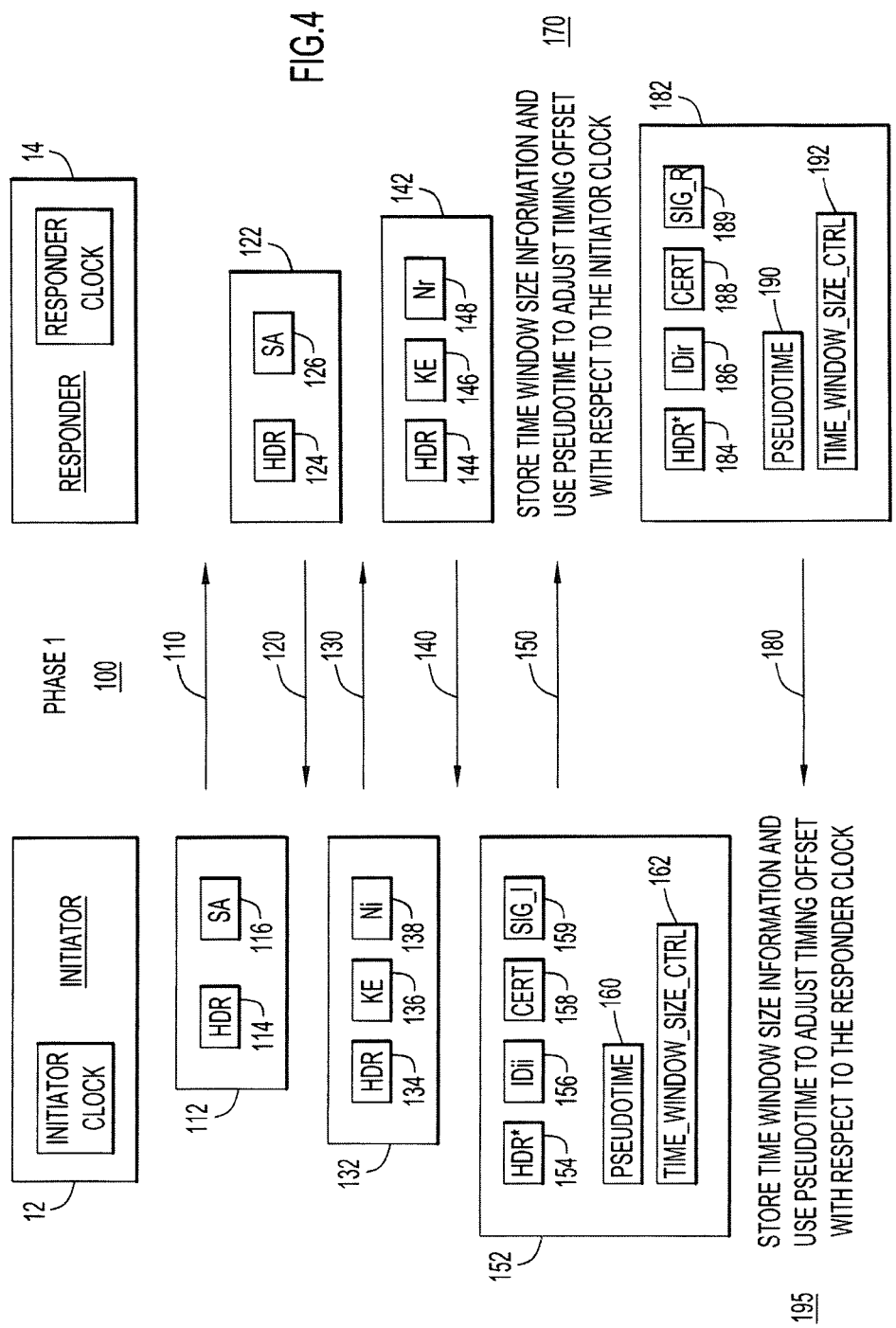
FIG. 4 is an example of a ladder diagram showing a first exchange of control messages between network devices during which message freshness parameters are exchanged.

Turning to FIG. 4, operations of the control plane message freshness process logic 40 during a first exchange of a first set of control messages between the initiator 12 and responder 14 are shown at reference numeral 100. This first exchange 100 corresponds to Phase 1 referred to above in FIG. 2. In one example, the control messages are exchanged in an Internet Key Exchange (IKE) protocol. In the IKE protocol, the first exchange of control messages between the initiator 12 and responder 14 occurs during the Phase 1 of the IKE protocol. During the Phase 1 of the IKE protocol, the initiator 12 and responder 14 exchange a series of messages to establish a secure authenticated channel with which to communicate.

Phase 1 of the IKE protocol can be accomplished in a "Main Mode" or an "Aggressive Mode." For simplicity, FIG. 4 depicts an example of a Main Mode of Phase 1 of the IKE protocol, though it should be understood that the techniques described herein may be used in other modes of the IKE protocol. It should also be understood that the techniques described herein may be used in connection with other key management protocol exchange.

FIG. 4 shows that the initiator 12 and responder 14 each have a clock (corresponding to clock 38 shown in FIG. 3). The initiator clock is used for timing reference at the initiator 12 and the responder clock is used for timing reference at the responder. As will become apparent hereinafter, one aspect of the techniques described herein is to adjust for any offsets between the clocks at the initiator 12 and responder 14. It should also be understood that the initiator 12 and responder 14 may in general be referred to as first and second network devices, respectively.

Referring to FIG. 4, at 110, the initiator 12 first generates and sends a control message 112 to the responder 14. Control message 112 contains an Internet Security Association and Key Management Protocol (ISAKMP) header (HDR) 114 and a Security Association (SA) negotiation payload 116 with one or more proposals for negotiation between the initiator 12 and responder 14. The initiator 12 may provide multiple proposals for the SA negotiation between the initiator 12 and the responder 14. At 120, the responder 14 responds to control message 112 with a control message 122 that contains an ISAKMP HDR 124 and SA payload 126 on behalf of the responder 14.

In response to receiving the control message 122, at 130, the initiator 12 generates and sends control message 132 to the responder 14. Control message 132 contains an ISAKMP HDR 134, a key exchange payload (KE) 136, and an initiator nonce payload (Ni) 138. The KE payload may be a key exchange payload such as Diffie-Hellman parameters associated with a cryptographic protocol that allows two entities that have no prior knowledge of each other to jointly establish a shared secret key over an insecure communication channel. The nonce payload may be a randomly generated number that is sent by the initiator 12 or the responder 14. The nonce is hashed along with the other items using the agreed upon key. The initiator 12 may check a cookie including the nonce and may reject any messages which do not have the correct nonce value. This helps to prevent replay since a third party can not predict the randomly generated nonce. In response to receiving the control message 132, at 140 the responder 14 sends control message 142. Control message 142 contains an ISAKMP HDR 144, a KE payload 146, and a responder nonce (Nr) payload 148. These components of message 142 serve functions to those similar components in control message 132.

In response to receiving control message 140, at 150 the initiator 12 sends a control message 152. Control message 152 contains an ISAKMP header with a payload encryption (HDR*) 154, an identification payload (IDii) 156 for the initiator 12, a certificate (CERT) payload 158, and a signature (SIG_I) payload 159 for the initiator 12. In one example, all payloads following the ISAKMP header HDR* are encrypted. Encryption keys are generated from keying material used by the ISAKMP Security Association to protect the confidentiality of its messages. For example, encryption keys can be generated from a SKEYID_e payload. The CERT payload 158 provides a means to transport certificates or other certificate-related information via the IKE protocol. CERT payloads are included in an exchange if certificates are available to the sender. The SIG_I payload may be the result of a negotiated digital signature algorithm that is applied to an initiator hash.

According to the techniques described herein, message 152 contains an additional Pseudotime payload 160 and a time window size (Time_window_size_ctrl) payload 162. The Pseudotime and Time_window_size_ctrl payloads 160 and 162 are in addition to those payloads used during the Phase I of the IKE. The Pseudotime payload 160 contains a timestamp or time of departure of control message 152 with respect to a timing reference derived from the initiator clock. The Time_window_size_ctrl payload 162 defines a time window to be used by the responder to test for freshness (replay or delay protection) of a control message received at the responder from the initiator during a second exchange of a second set of control messages (Phase 2). The time window size set by the initiator for use by the responder may be based on the network conditions and how much of a delay is acceptable.

In response to receiving the control message 152, at 170, the responder 14 stores the Time_window_size_ctrl payload 162 for use in control message freshness testing as explained hereinafter. In addition, the responder 14 may use the Pseudotime payload 160 to adjust any timing offset between a timing reference derived from the initiator clock and a timing reference derived from the responder clock. For example, upon receipt of control message 152, the responder 14 may adjust the responder clock such that the responder clock is synchronized with the initiator clock. In another form, the responder 14 may store information indicating the timing offset and use that information during the control message freshness determination described hereinafter to account for the timing offset between the two devices.

In response to receiving the control message 152, at 180 the responder 14 generates and sends message a similar control message 182. Control message 182 contains an ISAKMP header with a payload encryption HDR* 184, an identification payload (IDir) 186 for the responder 14, a CERT payload 188, and a signature payload (SIG_R) 189 for the responder 14. Control message 182 also contains a Pseudotime payload 190 and a Time_window_size_ctrl payload 192. The Pseudotime payload 190 comprises a timestamp or time of departure of control message 182 with respect to a timing reference derived from the responder clock. The Time_window_size_ctrl payload 192 defines a time window to be used by the initiator 12 for determining the freshness of a control message received by the initiator 12 from the responder 14 during Phase 2 as described hereinafter. At 195, the initiator 12 stores the Time_window_size_ctrl payload 192 for use in control message freshness testing with respect to control messages received from the responder 14. In addition, the initiator 12 may use the Pseudotime payload 190 to adjust for any timing offset between the initiator clock and the responder clock similar to that described above in connection with operation 170 at the responder.

Thus, by the completion of Phase 1, the responder 14 has time window size information received from the initiator to be used for control message freshness determination for control messages received from the initiator (during a subsequent control message exchange) and pseudotime timestamp information to enable the responder 14 to adjust for timing offsets with respect to the initiator. Similarly, the initiator 12 has time window size information received from the responder to be used for control message freshness determination for control messages received from the responder (during a subsequent control message exchange) and pseudotime timestamp information to enable the initiator 12 to adjust for timing offsets with respect to the responder 14.

Figure 5:
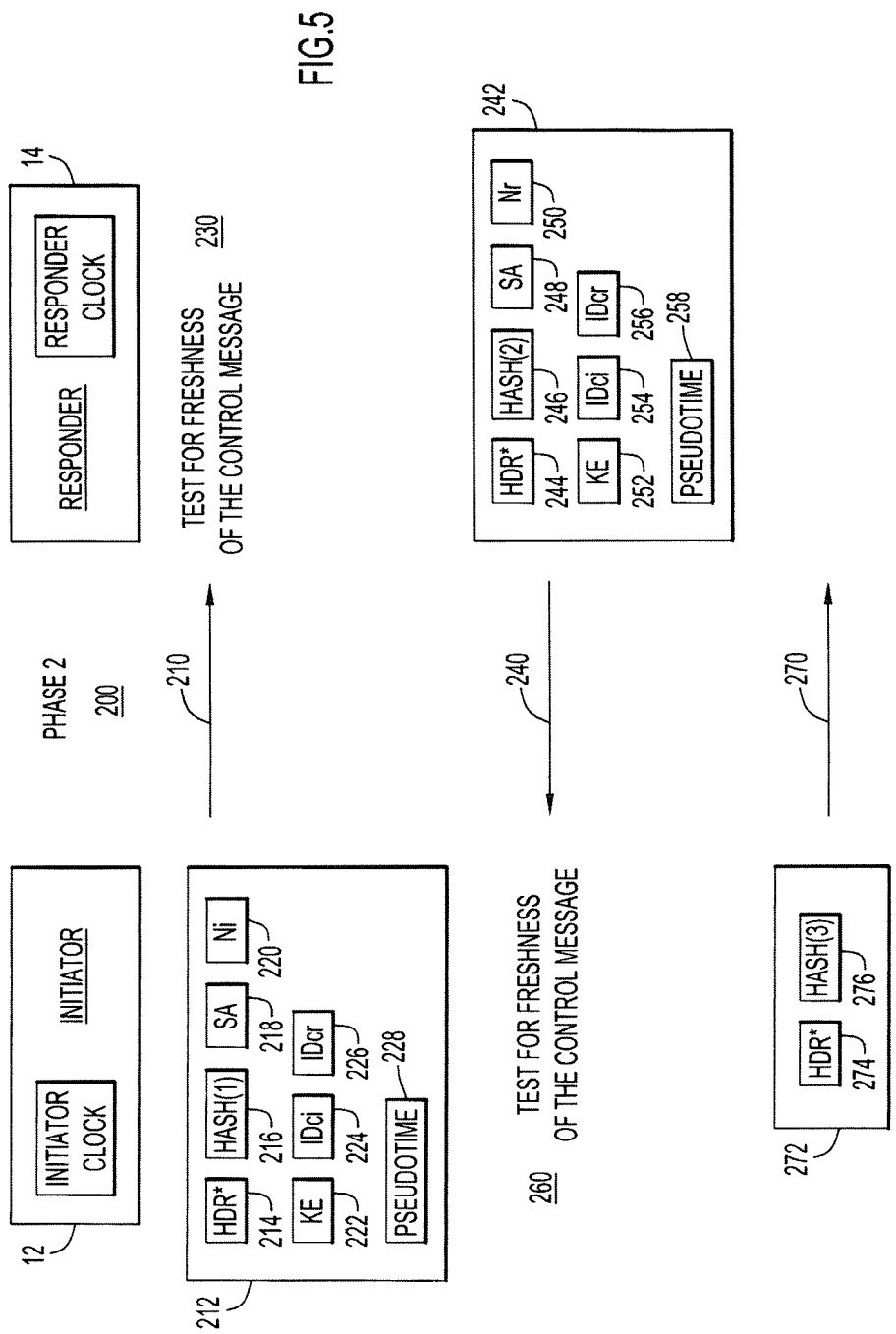
FIG. 5 is an example of a ladder diagram showing a second exchange of control messages between the network devices during which message freshness is analyzed.

Turning to FIG. 5, operations of the control plane freshness process logic 40 during a second exchange of a second set of control messages between the initiator 12 and the responder 14 are shown at reference numeral 200. The second exchange 200 corresponds to Phase 2 of the IKE protocol referred to above in FIG. 2. During Phase 2 of the IKE protocol, the initiator 12 and responder 14 exchange a series of control messages to negotiate Security Associations on behalf of services such as an Internet Protocol Security (IPsec) or any other service that needs key material and parameter negotiation. Phase 2 of the IKE protocol can be accomplished in a "Quick Mode." The Quick Mode is used as part of the Security Association negotiation process in Phase 2 to derive keying material and negotiate shared policy for non-ISAKMP Security Associations. The information exchanged in the Quick Mode needs to be protected by the ISAKMP Security association. That is, in the Quick Mode, all payloads except the ISAKMP header are encrypted. For simplicity, FIG. 5 depicts an example of a Quick Mode of Phase 2 of the IKE protocol, though it should be understood that the techniques described herein may be used in other modes of the IKE protocol.

At 210, the initiator 12 first generates and sends a control message 212 to responder 14. Control message 212 contains an ISAKMP header with payload encryption HDR* 214, a first hash (HASH(1)) payload 216, an SA negotiation payload 218, an Ni payload 220, a KE payload 222, an initiator client identifier payload (IDci) 224, a responder client identifier payload (IDcr) 226, and a Pseudotime payload 228. The HASH(1) payload 216 may be a pseudo-random function of a message identification from the ISAKMP header concatenated with the entire message that follows the hash including all payload headers, but excluding any padding added to the headers for encryption. The IDci payload 224 and IDcr payload 226 contain client identification information for the initiator 12 and responder 14 and may be used if the ISAKMP is acting as a client negotiator on behalf of another ISAKMP peer.

The Pseudotime payload 228 of message 212 comprises a timestamp for control message 212 with respect to the initiator clock. After receiving control message 212, at 230 the responder 14 may use the pseudotime information contained in the Pseudotime payload 228 of control message 212 as well as the time window size information received by the responder 14 during Phase 1 to test the freshness of control message 212. An example of the freshness testing operation is described hereinafter in connection with FIGS. 6 and 7.

In response to receiving the control message 212, at 240 the responder 14 generates and sends a similar control message 242. Control message 242 contains an ISAKMP header with payload encryption HDR* 244, a second hash (HASH(2)) payload 246, an SA payload 248, an Nr payload 250, a KE payload 252, an IDci payload 254, an IDcr payload 256, and a Pseudotime payload 258. The HASH(2) payload 246 is typically identical to the HASH(1) payload 216 in control message 212 except that the nonce payload, Nr, 240 is added after the message identification header but before the complete message.

The Pseudotime payload 258 of message 242 comprises a timestamp for control message 242 with respect to the responder clock. After receiving control message 242, the initiator 12 may use the pseudotime information contained in the Pseudotime payload 248 of control message 232 as well as the time window size information received by the initiator 12 during Phase 1 to test the freshness of control message 242.

Again, an example of the freshness testing operation is described hereinafter in connection with FIGS. 6 and 7.

In response to receiving the control message 242, at 270 the initiator 12 generates and sends control message 272. Control message 272 contains an ISAKMP header with payload encryption HDR* 274 and a third hash (HASH(3)) payload 276. The HASH(3) payload 276 may be a pseudo-random function over a zero value, followed by a concatenation of a message identification and an initiator nonce and a responder nonce.

Figure 6:
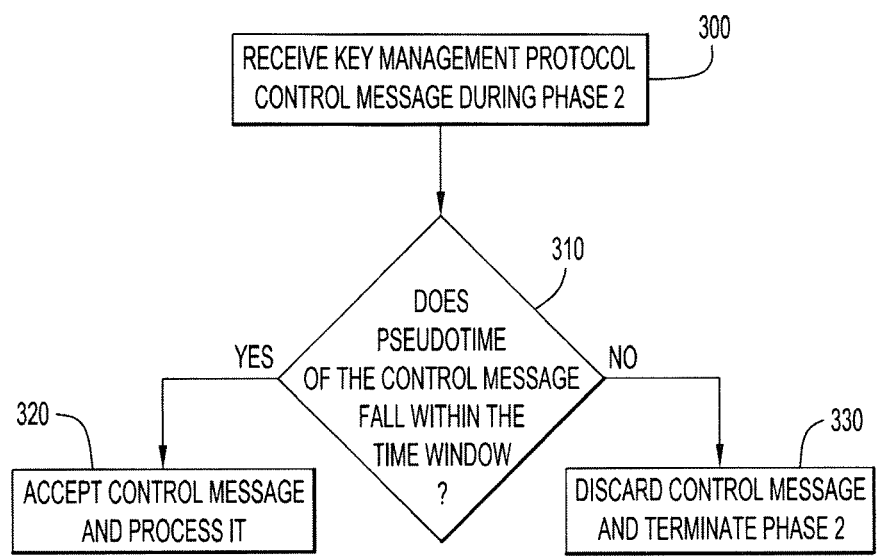
FIG. 6 is an example of a flow chart for a control message freshness determination operation made during the second exchange of control messages.

Turning to FIG. 6, an example of a flow chart for the control message freshness determination operations performed by the responder at 14 in FIG. 5 and by the initiator at 12 in FIG. 5 is now described. At 300, the control message is received, either by the initiator or by the responder. For example, a control message is received by the initiator 12 or the responder 14 in Phase 2 of the IKE, as described above. After a control message is received by an initiator 12 or responder 14 in Phase 2, the initiator 12 or responder 14 may determine the freshness of the control message by operation 310. For example, at 310, the initiator 12 may test for freshness the control message received by the initiator 12 from the responder 14 during Phase 2 by determining whether the pseudotime information for the control messages falls within the time window corresponding to the time window size information received by the initiator 12 during Phase 1. Similarly, the responder 14 may test for freshness the control message received by the responder 14 during Phase 2 by determining whether the pseudotime information for the control message falls within the time window corresponding to the time window size information received by the responder 14 during Phase 1. Furthermore, as mentioned above, the freshness determination operation 310 may involve adjusting for any timing offset between a timing reference of the device that sent the control message (whose freshness is being tested) and a timing reference of the device that receives that control message. This adjustment may be to add or subtract time to the time window 312 depending on the timing offset between the two devices.

If a control message is determined to be fresh (i.e., if the pseudotime timestamp information of the control message falls within the time window), the initiator 12 or responder 14 will accept the control message and will process it as indicated at 320. If the pseudotime timestamp information for the control message does not fall within the time window corresponding to the time window size information received by the initiator 12 or responder 14 during Phase 1, the control message is determined to not be fresh, and the initiator 12 or responder 14 may discard the control message as indicated at 330, and subsequently restart Phase 2.

Figure 7:
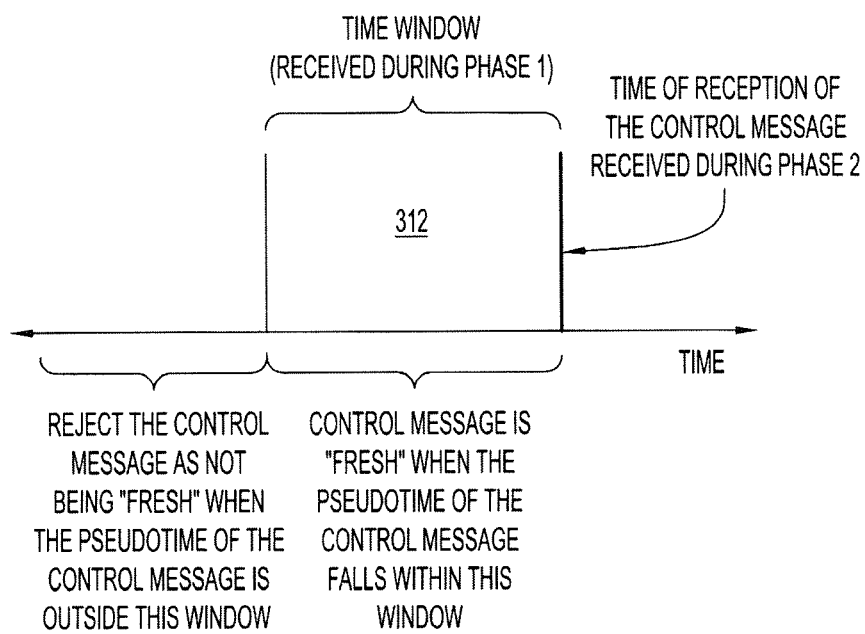
FIG. 7 is an example of a diagram showing a time window comparison for control message freshness.

FIG. 7 graphically shows the freshness determination operation 310 of FIG. 6. When a control message is received at the receiving device (responder or initiator), the pseudotime timestamp information of the control message is compared against a time window that begins with the time of reception of the control message and extends for a duration corresponding to the time window size received from the other device in Phase 1. This time window is shown at 312 in FIG. 7. When it is determined that the pseudotime timestamp of the control message falls within the time window 312, the control message is deemed to be fresh. If the pseudotime timestamp information of the control message falls outside of the time window 312, the control message is deemed not to be fresh and the control message is rejected.

Figure 8:
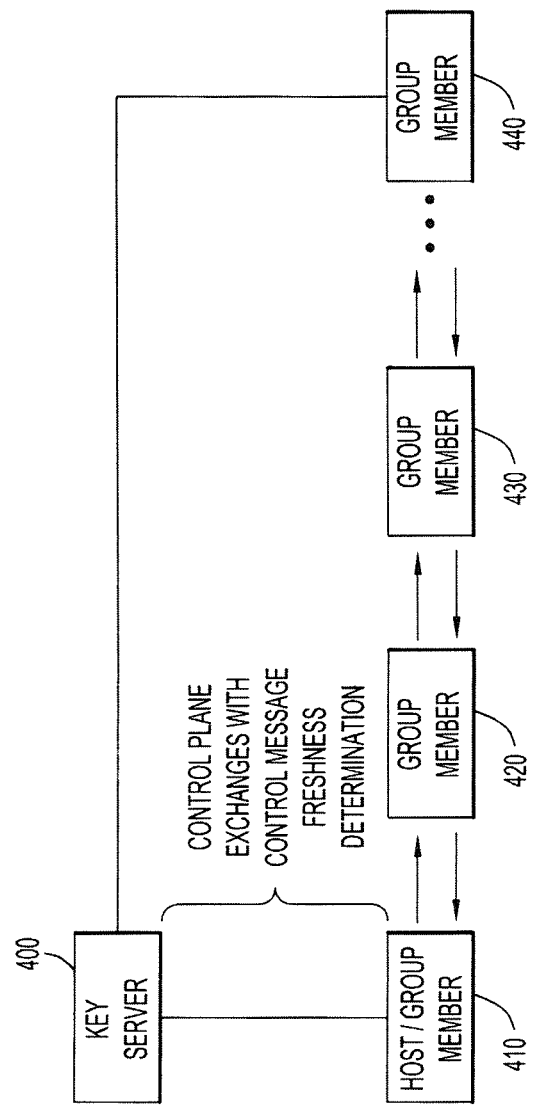
FIG. 8 is an example of a block diagram for a group keying protocol exchange where control message exchanges between a key server device and a plurality of group member devices use the control message freshness determination techniques.

Reference is now made to FIG. 8, which is an example of a block diagram for one application of the techniques described herein. In this application, a group keying protocol exchange comprising control message exchanges occurs between a key server device 400 and a plurality of group member devices (410, 420, 430, 440) using the control message freshness determination techniques described above. For example, the control message exchanges may be similar to those described for Phase 1 and Phase 2 of the IKE. The control messages may exchange pseudotime information and time window size information in Phase 1 between key server 400 and any group member (for example group member 410), and the control messages may exchange pseudotime information in Phase 2 between key server 400 and any group member. The key server 400 and group members (for example, group member 410) may use the techniques described above to determine the freshness of the control messages and to adjust for a timing offset between a clock of the key server 400 and a clock of the respective group member. In one example, a Group Domain of Interpretation (GDOI) protocol may be used for the group key management system in FIG. 8.

Figure 9:
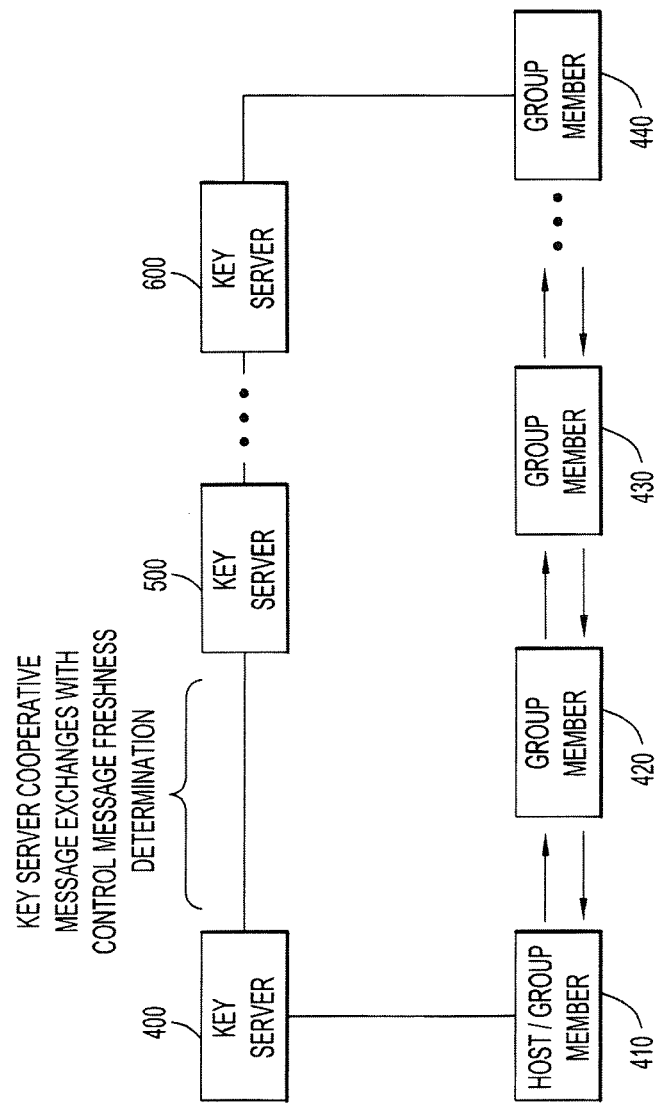
FIG. 9 is an example of a block diagram showing a cooperative keying protocol exchange where message exchanges between respective pairs of a plurality of key server devices use the control message freshness determination techniques.

Reference is now made to FIG. 9 that shows an example of a block diagram depicting another application of the techniques described herein. In this example, a plurality of key server devices (400, 500, 600) engage in a cooperative (co-op) keying protocol exchange involving control message exchanges between each other using the control message freshness determination techniques. If there is a delayed replay attack of the announcement message between the co-op enabled key servers, then the remaining SA lifetime is jittered on each of these key servers. This is a value that will be propagated to each group member that registers to the key server. Therefore, the data path between the group members will be impacted. For example, the control message exchanges may be similar to those described for Phase 1 and Phase 2 of the IKE. The control messages may exchange pseudotime information and time window size information in Phase 1 between a plurality of key servers (for example between key server 400 and key server 500), and the control messages may exchange pseudotime information in Phase 2 between the plurality of key servers. The key servers may then use the techniques described above to determine the freshness of the control messages and to adjust for a timing offset between clocks of respective key servers participating in the exchange of control messages.

In sum, an apparatus is provided comprising a network interface unit configured to enable communications over a network, a clock circuit configured to generate one or more timing signals, and a processor configured to be coupled to the network interface unit. The processor is configured to generate timestamp information and time window size information to be included in a control message to be sent to an other apparatus during a first exchange of a first set of control messages, the timestamp information indicating a time of departure of the control message with respect to a timing signal of the clock circuit and the time window size information defining a time window to be used by the other apparatus to test for freshness of a control message received at the other apparatus during a second exchange of a second set of control messages. The processor is further configured to recover timestamp information and time window size information from the other apparatus during the first exchange, the time window size information defining a time window to be used to test for freshness of a control message received from the other apparatus during the second exchange of the second set of control messages and the timestamp information recovered from the control message representing a time of departure of the control message from the other apparatus.

Similarly, a tangible computer-readable memory medium is provided that stores or is encoded with instructions that, when executed by a processor, cause the processor to: generate timestamp information and time window size information to be included in a control message to be sent from a first device that is to enter into a secure communication with a second device during a first exchange of control messages between the first device and the second device, the time window size information defining a time window to be used by the second device to test for freshness of a control message received at the second device from the first device during a second exchange of a second set of control messages and the timestamp information indicating a time of departure of the control message with respect to a timing reference of the first device. Instructions are encoded or stored on the computer-readable memory medium that, when executed by a processor, cause the processor to recover timestamp information and time window size information in a control message received from the second device during the first exchange, the time window size information received from the second device defining a time window to be used by the first device to test for freshness of a control message received at the first device from the second device during the second exchange of the second set of control messages, and the timestamp information contained in the control message received at the first device indicating a time of departure of the control message with respect to a timing reference of the second device.

The foregoing techniques are useful to prevent replay and delay packet attacks during a control plane exchange between two devices over a network, such as during the exchange of control messages that are sent between devices during a key exchange procedure. These techniques provide for the ability to determine freshness of packets carrying time sensitive information which is particularly useful to protect from delayed and replayed attacks leading to traffic loss.

These techniques provide for detecting freshness of control packets carrying time sensitive information like SA payload which carry the SA and the keys with a specific lifetime. When applied to key server group members, these techniques prevent group members from accepting stale pseudotime information which otherwise would defeat the purpose of time-based replay protection in large multi-sender networks.

Time-based anti-replay techniques mitigate replay attacks for data packets sent to a group assuming that every group member is synchronized with the correct pseudotime from the key server. When a registration/re-key packet that carries the pseudotime is captured and replayed, there is no way for the group member to detect this delay. The SAs will incorrectly carry the skewed pseudotime and the all the data packets thereafter sent to the group would be dropped by the members as the pseudotime on the packets will not fall within the time-based window. This would be corrected only at the next re-key if the re-key packet is not delayed, which depending on the re-key period could be a relatively long period of time. This delay can cause a huge loss of data packets and also all the members of the group would be unnecessarily spending system resources leading to a massive denial-of-service (DoS) attack and eventually a network outage. The techniques described herein provide delayed replay protection for control packets that carry time sensitive pseudotime information.

The above description is intended by way of example only. Various modifications and structural changes may be made therein without departing from the scope of the concepts described herein and within the scope and range of equivalents of the claims.

What is claimed is:

1. A method comprising:
   at a first device that is to enter into a secure communication session with a second device, sending timestamp information and time window size information in a control message to the second device during a first exchange of a first set of control messages between the first device and the second device, the time window size information defining a time window to be used by the second device to test for freshness of a control message received at the second device from the first device during a second exchange of a second set of control messages and the timestamp information representing a time of departure of the control message from the first device with respect to a timing reference of the first device, wherein messages exchanged during the first exchange and during the second exchange comprise messages that are part of a same control plane exchange session between the first device and the second device; and
   at the first device, receiving timestamp information and time window size information from the second device in a control message during the first exchange from the second device, the time window size information received from the second device defining a time window to be used by the first device to test for freshness of a control message received at the first device from the second device during the second exchange of the second set of control messages, and the timestamp information contained in the control message received at the first device representing a time of departure of the control message from the second device with respect to a timing reference of the second device, wherein the first exchange of the first set of control messages corresponds to Phase 1 of an Internet Key Exchange process and the second exchange of the second set of control messages corresponds to Phase 2 of the Internet Key Exchange process.

2. The method of claim 1, and further comprising:
   at the first device, sending a control message containing timestamp information during the second exchange to the second device;
   at the first device, receiving a control message containing timestamp information from the second device during the second exchange and obtaining the timestamp information from the received control message; and
   at the first device, testing for freshness of the control message received from the second device during the second exchange based on the timestamp information of the control message received during the second exchange and the time window size information received from the second device during the first exchange.

3. The method of claim 2, further comprising including the timestamp information and time window size information in payload fields of the control message sent during the first exchange.

4. The method of claim 2, wherein testing comprises determining whether the timestamp information for the control message received from the second device during the second exchange falls within the time window corresponding to the time window size information received from the second device during the first exchange.

5. The method of claim 4, further comprising discarding the control message if the timestamp information for the control message received from the second device during the second exchange does not fall within the time window corresponding to the time window size information received from the second device during the first exchange.

6. The method of claim 1, wherein sending and receiving are performed during a key management protocol exchange between the first device and the second device.

7. The method of claim 1, wherein sending and receiving are performed during a group keying protocol exchange between the first device comprising a key server device and the second device comprising a group member device.

8. The method of claim 1, wherein sending and receiving are performed during a cooperative keying protocol exchange between a plurality of key server devices, wherein the first device is a first key server device and the second device is a second key server device.

9. The method of claim 1, and further comprising at the first device, adjusting for a timing offset between the timing reference of the first device and the timing reference of the second device using the timestamp information contained in the control message received from the second device during the first exchange.

10. An apparatus comprising:
a clock circuit configured to generate one or more timing signals;
a network interface unit configured to enable communications over a network; and
a processor configured to be coupled to the network interface unit and to:
generate timestamp information and time window size information to be included in a control message to be sent to an other apparatus during a first exchange of a first set of control messages with the other apparatus, the timestamp information representing a time of departure of the control message with respect to a timing signal of the clock circuit and the time window size information defining a time window to be used by the other apparatus to test for freshness of a control message received at the other apparatus during a second exchange of a second set of control messages, wherein the messages exchanged during the first exchange and during the second exchange comprise messages that are part of a same control plane exchange session between the first device and the second device; and
recover timestamp information and time window size information from a control message received from the other apparatus during the first exchange, the time window size information recovered from the received control message defining a time window to be used to test for freshness of a control message received from the other apparatus during the second exchange of the second set of control messages and the timestamp information recovered from the control message representing a time of departure of the control message from the other apparatus, wherein the first exchange of the first set of control messages corresponds to Phase 1 of an Internet Key Exchange process and the second exchange of the second set of control messages corresponds to Phase 2 of the Internet Key Exchange process.

11. The apparatus of claim 10, wherein the processor is further configured to:
generate a control message containing timestamp information to be sent to the other apparatus during the second exchange;
recover from a control message received during the second exchange from the other apparatus timestamp information; and
test for freshness of the control message received from the other apparatus during the second exchange based on the timestamp information of the control message and the time window size information received from the other apparatus during the first exchange.

12. The apparatus of claim 11, wherein the processor is configured to test for freshness of the control message received during the second exchange by determining whether the timestamp information for the control message received during the second exchange falls within the time window corresponding to the time window size information received from the other apparatus during the first exchange.

13. The apparatus of claim 10, wherein the processor is further configured to adjust for a timing offset between a timing signal of clock circuit and a timing signal of the other apparatus using the timestamp information contained in the control message received during the first exchange.

14. A non-transitory computer-readable memory medium storing instructions that, when executed by a processor, cause the processor to:
at a first device, generate timestamp information and time window size information to be included in a control message to be sent from the first device that is to enter into a secure communication with a second device during a first exchange of control messages between the first device and the second device, the time window size information defining a time window to be used by the second device to test for freshness of a control message received at the second device from the first device during a second exchange of a second set of control messages and the timestamp information representing a time of departure of the control message with respect to a timing reference of the first device, wherein messages exchanged during the first exchange and during the second exchange comprise messages that are part of a same control plane exchange session between the first device and the second device; and
recover timestamp information and time window size information in a control message received from the second device during the first exchange, the time window size information received from the second device defining a time window to be used by the first device to test for freshness of a control message received at the first device from the second device during the second exchange of the second set of control messages, and the timestamp information contained in the control message received at the first device representing a time of departure of the control message with respect to a timing reference of the second device, wherein the first exchange of the first set of control messages corresponds to Phase 1 of an Internet Key Exchange process and the second exchange of the second set of control messages corresponds to Phase 2 of the Internet Key Exchange process.

15. The non-transitory computer-readable medium of claim 14, further comprising instructions that cause the processor to:
generate a control message containing timestamp information to be sent during the second exchange to the second device;
recover from a control message received during the second exchange from the second device timestamp information; and
test for freshness of the control message received from the second device during the second exchange based on the timestamp information of the control message and the time window size information received from the second device during the first exchange.

16. The non-transitory computer-readable medium of claim 15, wherein the instructions that cause the processor to test for freshness of the control message comprises instructions that cause the processor to determine whether the timestamp information for the control message received from the second device during the second exchange falls within the time window corresponding to the time window size information received from the second device during the first exchange.

17. The non-transitory computer-readable medium of claim 14, further comprising instructions that cause the processor to adjust for a timing offset between the timing reference of the first device and the timing reference of the second device using the timestamp information contained in a control message received from the second device during the first exchange.

18. The non-transitory computer-readable medium of claim 14, further comprising instructions that cause the processor to include the timestamp information and time window size information in payload fields of the control message during the first exchange.

19. The non-transitory computer-readable medium of claim 16, further comprising instructions operable to discard the control message if the timestamp information for the control message received from the second device during the second exchange does not fall within the time window corresponding to the time window size information received from the second device during the first exchange.

* * * * *